United States Patent  
Bartosch et al.

(10) Patent No.: US 8,261,553 B2  
(45) Date of Patent: Sep. 11, 2012

(54) DRIVE TRAIN COMPRISING AN EXPANDER DRIVEN BY FLUID OR STEAM

(75) Inventors: Stephan Bartosch, Rammingen (DE); Jurgen Berger, Gerstetten (DE)

(73) Assignee: Voith Patent GmbH, Heidenheim (DE)

( * ) Notice: Subject to any disclaimer, the term of this patent is extended or adjusted under 35 U.S.C. 154(b) by 476 days.

(21) Appl. No.: 12/449,277

(22) PCT Filed: Jan. 31, 2008

(86) PCT No.: PCT/EP2008/000778  
§ 371 (c)(1), (2), (4) Date: Jul. 29, 2009

(87) PCT Pub. No.: WO2008/095642  
PCT Pub. Date: Aug. 14, 2008

(65) Prior Publication Data  
US 2010/0101228 A1    Apr. 29, 2010

(30) Foreign Application Priority Data  
Feb. 5, 2007  (DE) .......................... 10 2007 006 420

(51) Int. Cl.  
*F01B 29/04* (2006.01)
(52) U.S. Cl. ................ 60/712; 60/716; 60/618
(58) Field of Classification Search ............ 60/710–712, 60/716–719, 614, 616, 618  
See application file for complete search history.

(56) References Cited

U.S. PATENT DOCUMENTS

| | | | | |
|---|---|---|---|---|
| 1,764,061 A | * | 6/1930 | Wach | ............................... 60/715 |
| 1,845,087 A | * | 2/1932 | Hodgkinson | .................. 60/709 |
| 2,007,032 A | * | 7/1935 | Wach | ............................... 60/715 |
| 3,986,575 A | * | 10/1976 | Eggmann | ..................... 180/302 |
| 4,754,612 A | * | 7/1988 | Dibrell et al. | ..................... 62/87 |
| 5,121,607 A | * | 6/1992 | George, Jr. | ..................... 60/712 |
| 5,195,881 A | | 3/1993 | George, Jr. | |
| 5,241,817 A | | 9/1993 | George, Jr. | |
| 5,806,479 A | * | 9/1998 | Bauer et al. | ............ 123/142.5 R |

(Continued)

FOREIGN PATENT DOCUMENTS  
DE        31 48 208        6/1983  
(Continued)

*Primary Examiner* — Hoang Nguyen  
(74) *Attorney, Agent, or Firm* — Farjami & Farjami LLP

(57) ABSTRACT

The invention is characterized in that the expander is integrated into the secondary side of the transmission by means of one or more of the following features: the expander has a housing which substantially completely surrounds the expander; the expander is equipped with a drive shaft which projects out of the housing and has a coupling element that is fixed to the drive shaft and that produces a drive connection. The housing of the expander is mounted on the secondary side on the exterior of a transmission housing that surrounds the transmission, or is mounted from the exterior and partially inserted into the transmission housing, in such a way that the coupling element of the drive shaft projects into the transmission housing, producing a direct or indirect drive connection to the transmission output; the transmission has a heat exchanger, which is used to cool transmission oil for lubricating the transmission and/or actuating clutches or brakes inside the transmission, the working medium of the expander being conducted through the heat exchanger in such a way that heat is dissipated from the working medium to partially or completely condense the latter or that heat in the heat exchanger is transferred to the working medium of the expander to heat the latter.

20 Claims, 1 Drawing Sheet

U.S. PATENT DOCUMENTS

| | | | | |
|---|---|---|---|---|
| 5,896,746 A | * | 4/1999 | Platell | 60/618 |
| 6,598,398 B2 | * | 7/2003 | Viteri et al. | 60/716 |
| 7,111,669 B2 | * | 9/2006 | Hoglinger et al. | 165/140 |
| 2003/0110772 A1 | | 6/2003 | Berglund | |

FOREIGN PATENT DOCUMENTS

| | | |
|---|---|---|
| DE | 3245351 | 6/1984 |
| DE | 101 43 342 A1 | 4/2003 |
| EP | 1 243 758 A1 | 9/2002 |
| GB | 644759 | 10/1950 |
| GB | 2080432 | 2/1982 |
| JP | 02-157423 | 6/1990 |
| WO | WO 85/02228 | 5/1985 |
| WO | WO 2007/099438 A1 | 9/2007 |

* cited by examiner

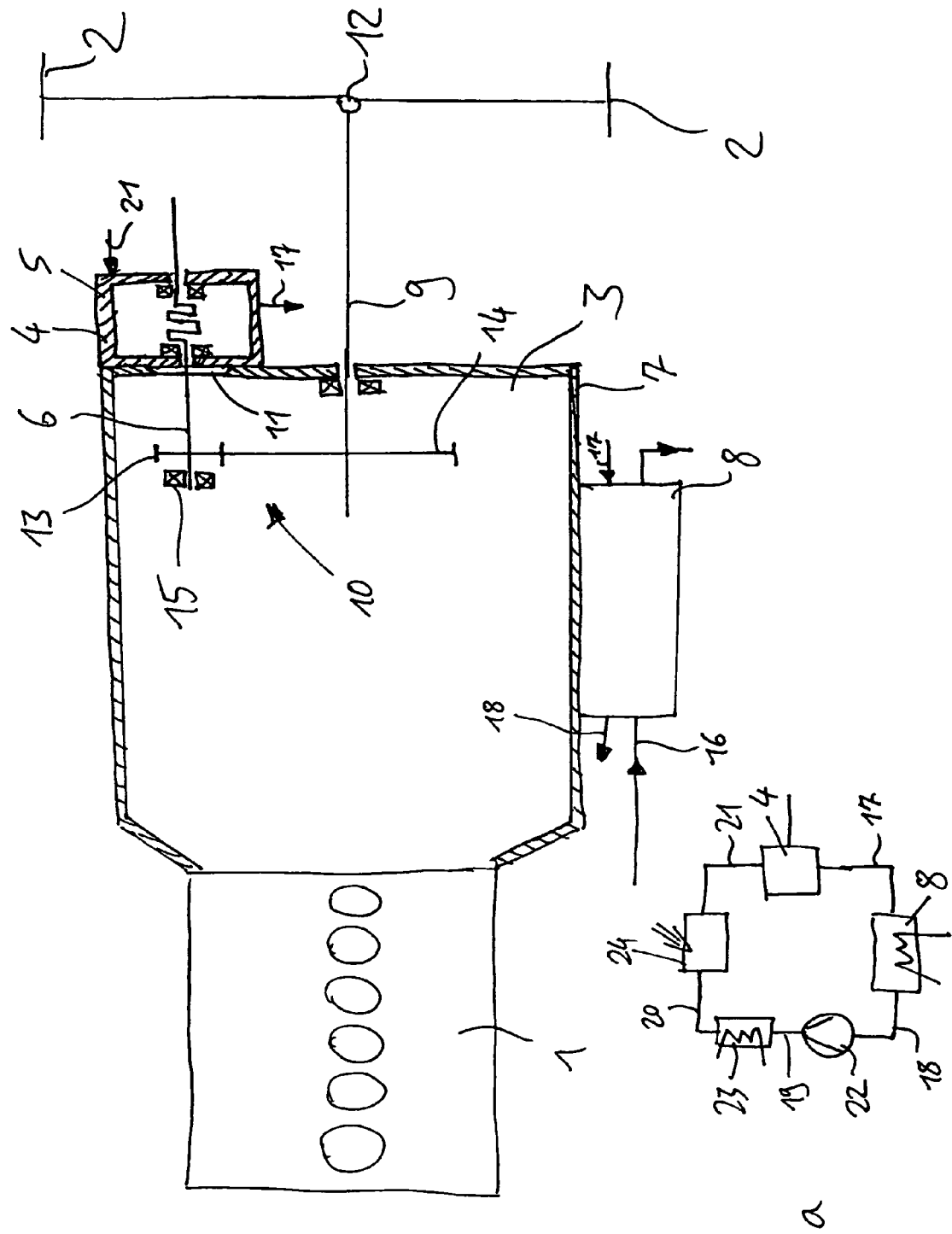

DRIVE TRAIN COMPRISING AN EXPANDER DRIVEN BY FLUID OR STEAM

This is a U.S. national phase application which is based on, and claims priority from, PCT application Ser. No. PCT/EP2008/000778, filed on Jan. 31, 2008, which claims priority from foreign application Ser. No. 10 2007 006 420.0, filed on Feb. 5, 2007, in Germany.

The present invention relates to a drive train, especially a vehicle drive train, comprising a transmission and an expander driven by a fluid or steam as a working medium, in detail with the features of the preamble of claim 1.

Drive trains in which both a transmission and a steam-operated expander are arranged are described in the patent specifications U.S. Pat. Nos. 5,121,607, 5,214,817, and 5,195,881. The transmission is arranged as a continuously variable transmission (CVT) and comprises an expander on a so-called PTO (power take-off) which can also be used as a compressor in order to brake the vehicle. The expander can be connected and disconnected from the transmission by a separating clutch.

Although the described vehicle trains comprise both an expander and a conventional transmission which additionally may comprise a retarder for example, both units are arranged to be spatially separated from one another and are connected with each other via the output shaft of the PTO. The expander is provided completely outside of the transmission. This means that the units require separate supply lines in order to lubricate bearings in the transmission and the expander for example. Oil which is heated in the transmission and is used as a lubricating medium and for switching or actuating clutches and brakes is heated and needs to be cooled through a transmission oil cooler. Similarly, the expander requires heat exchangers in order to supply suitable heat to the working medium according to the provided steam power process in order to evaporate the same and to withdraw heat in order to condense the same. This makes the production and maintenance of the proposed drive trains comparatively expensive and leads to a considerable overall size.

The present invention is based on the object of further developing the known drive trains in such a way that the production costs, the operating costs and the required overall space are minimized considerably.

The object in accordance with the invention is achieved by a drive train with the features of claim 1. The dependent claims provide advantageous and especially appropriate arrangements of the invention.

The drive train in accordance with the invention, especially a vehicle drive train such as one for a passenger car, truck or railway vehicle for example, comprises an engine for supplying driving power to the drive train in order to drive driving wheels or a work machine via a drive connection. The engine is arranged as an internal combustion engine, usually a diesel engine or any other piston engine. The work machine can be a generator, a hydrostatic pump or any other unit for example.

A transmission is provided in accordance with the invention which is provided for speed and/or torque conversion in the drive connection between engine and driving wheels or between engine and work machine and comprises a primary side with a transmission input and a secondary side with a transmission output. The transmission input is usually formed by a transmission input shaft and the transmission output is usually formed by a transmission output shaft. The engine supplies driving power to the transmission input and the driving wheels or the work machine is driven via the transmission output. The driving wheels are driven for example via a differential in the drive connection behind the transmission output.

Furthermore, an expander is provided which is driven by a fluid or steam as a working medium. The working medium is expanded by means of the expander and mechanical energy or mechanical power is thus gained which can be supplied as additional driving power to the drive train for driving the wheels or for driving the work machine. It is alternatively or additionally possible to drive an additional unit, especially an auxiliary unit of the drive train by means of the expander.

The invention is characterized in that the expander is arranged on the secondary side of the transmission and is integrated in the transmission. The arrangement on the secondary side ensures that the drive shaft of the expander revolves depending on the speed of the transmission output or depending on the drive speed when the expander is used for the traction of the vehicle. The integration of the expander in the transmission in accordance with the invention shall be understood to be at least the following two possibilities for integration, of which one can be configured alone or both jointly:

In accordance with a first integrative idea, the expander comprises a housing which surrounds the expander completely or at least to a substantial extent, and further a drive shaft through which a blade wheel, a crankshaft, a camshaft or the like is driven, or is arranged by the same. A coupling element for producing a drive connection is provided on the drive shaft. The coupling element is rigidly connected with the drive shaft. The drive shaft protrudes from the housing of the expander and carries the coupling element outside of the housing, especially directly on the free axial end or in the region of the free axial end of the drive shaft. The housing of the expander is mounted in such a way on the secondary side on the outside on a transmission housing surrounding the transmission or is mounted to be inserted in such a way from the outside at least partly in the transmission housing that the drive shaft protrudes with its coupling element into the transmission housing and produces a direct or indirect drive connection with the transmission output. For example, the coupling element can be arranged as a gearwheel or pinion which combs with a gearwheel on the transmission output, especially the transmission output shaft, or which is in drive connection directly via an intermediate gearwheel or a plurality of intermediate gearwheels with the transmission output or the transmission output shaft.

The coupling element can be arranged integrally with the drive shaft or be mounted on the same with a press fit. A firmly bonded connection such as welding/soldering or gluing can be considered.

The transmission or its transmission housing is advantageously arranged in such a way that the drive shaft can be inserted with its coupling element into the transmission when the transmission is fully mounted and after the insertion it is only necessary to fasten the expander to the transmission or transmission housing. When the transmission housing comprises a base body in the form of a trough and a cover for example which is placed from above onto the base body and is fastened to the same, base body and cover can be mounted first before the drive shaft of the expander is inserted with its coupling element especially laterally into the transmission.

It is principally also possible to mount the coupling element at first in the transmission and thereafter, when the transmission is fully mounted, to produce a torque-proof connection with the drive shaft by insertion and producing a plug-in connection.

According to a second integrative idea in accordance with the invention, the transmission comprises a heat exchanger by means of which a transmission oil is cooled for lubricating the transmission and/or for actuating clutches or brakes within the transmission, and the working medium of the expander is guided in such a way through said heat exchanger that heat is dissipated from the working medium in the heat exchanger in order to condense the working medium partly or in full, or heat is transferred to the working medium of the expander in order to heat the same, and especially to preheat the same for subsequent evaporation in an evaporator. The clutches and brakes within the transmission are usually used to shift different gears in the transmission. As a result, the clutches can be arranged as multiple-disk clutches for example. Alternatively or in addition, a hydrodynamic coupling operated with transmission oil and/or a hydrodynamic retarder operated with transmission oil and/or a hydrodynamic converter operated with transmission oil can be provided in the transmission which transfer(s) heat into the transmission oil which is dissipated by the heat exchanger (transmission oil cooler) to the ambient environment, a cooling medium circuit, especially a vehicle cooling circuit, and/or the working medium of the expander.

The drive shaft of the expander is subjected to speed-increasing ratio against the transmission output, especially in relation to the transmission output shaft, especially by means of a spur gear drive. Alternatively or in addition, a shiftable multi-step transmission can be provided in the drive connection between the drive shaft of the expander and the transmission output in order to optionally vary the gear ratio between the drive shaft of the expander and the transmission. It is understood that a continuously variable transmission is also considered in order to vary the gear ratio accordingly.

In order to simplify the mounting of the expander on the transmission or the transmission housing, a centering device can be provided on the drive shaft of the expander and/or on the housing of the expander, which centering device is arranged especially in the shape of a centering disk. For example, the centering disk or a respective centering collar has a conical surface (radially on the outside or radially on the inside) which engages in a respective conical surface arranged in a diametrically opposed manner or comes to rest on the same when the expander is placed on the housing of the transmission or is inserted into the transmission and is fastened.

The expander and the transmission can have a joint lubrication oil supply. For example, a single lubrication oil sump or several lubrication oil sumps are provided within the transmission housing which is/are used simultaneously as a lubrication oil sump for the components of the expander to be lubricated. The expander can thus be free from a lubrication oil sump itself.

According to one embodiment, at least one further unit can be driven by the drive shaft of the expander, e.g. a pump, especially a water pump, a fuel pump and/or an oil pump. Alternatively or in addition, a hydrodynamic retarder can also be driven through the drive shaft of the expander. The unit driven by the expander or the hydrodynamic retarder is carried by the drive shaft of the expander in an especially advantageous manner.

The drive shaft of the expander is advantageously arranged as a plug-in shaft in combination with the coupling element provided on the same, e.g. a pinion or pulley, which plug-in shaft is inserted with its free end on which the coupling element is arranged into a bearing present in the transmission, especially in the case of a transmission that has already been assembled. For this purpose, the drive shaft can be inserted into a bearing inner ring, or can carry a bearing inner ring itself and can be inserted jointly with the bearing inner ring into a bearing outer ring.

The invention will be explained in an exemplary manner below in closer detail by reference to an embodiment, with individual features of the embodiment being capable of being provided separate from the other illustrated features in order to achieve a solution in accordance with the invention.

FIG. 1 shows a highly schematic illustration of a possible embodiment of a drive train in accordance with the invention, comprising an engine 1 which drives driving wheels 2 via a transmission 3 with a transmission output shaft 9 and via a differential 12. The illustrated embodiment relates to a road vehicle. When arranged as a rail vehicle, one or several wheelset gears are considered instead of the differential in order to transfer drive power from the transmission output onto the driven wheels. Other embodiments are possible.

An expander 4, which is arranged in the present case as a steam-operated expander (steam expander), is provided on the secondary side of the transmission 3. As indicated, the expander 4 is arranged as a piston engine. Other embodiments can be considered such as screw machines or a turbine, especially a steam turbine. The expander 4 is also used in the illustrated embodiment to transfer drive power to the drive wheels 2 of the vehicle, and thus to contribute to the traction of the vehicle. In addition, a further unit could be provided for example on the illustrated free end, which means the end of the drive shaft 6 of the expander 4 which faces away from the transmission 3, which further unit is driven by the expander 4, e.g. a water pump, fuel pump or oil pump.

The expander 4 is mounted on the secondary side on the transmission housing 7 of transmission 3 in such a way that the drive shaft 6 protrudes with its coupling element, presently in the form of a pinion 13, into the transmission housing 7 and is in a drive connection with an external gearwheel 14 carried by the transmission output shaft 9. Instead of the illustrated spur gear drive 10 which is formed by the external gearwheel 14 and the pinion 13, another embodiment of a drive connection can also be considered such as a connection via a V-belt with two V-belt pulleys or toothed belt with two toothed pulleys.

When the transmission 3 is readily mounted, which means when the transmission housing 7 is substantially or completely closed, the drive shaft 6 of the transmission can be inserted into the transmission housing 7 and can be threaded into the bearing 15 shown there, which carries the axially outer free end of the drive shaft 6 after the mounting of the expander 4. It is thus possible to produce the expander 4 separate from the transmission 3 and to connect or fasten the same to the readily mounted transmission 3 in the pre-mounted state. In order to achieve a centering of the expander 4 or its drive shaft 6 in relation to the transmission 3 or the bearing 15, the housing 5 of the expander and/or the drive shaft 6 of the expander 4 comprises a centering disk 11 which engages in a centering manner in an opening in the transmission housing 7 arranged in a respectively diametrically opposed way.

In the illustrated embodiment, a heat exchanger 8 for dissipating heat from the transmission 3 or from the transmission oil used in the transmission 3 is provided outside on the transmission housing 7. Alternatively or in addition, this heat exchanger 8 could be integrated partly or fully in the transmission 3, which means it could be surrounded partly or fully by the transmission housing 7. In addition to the cooling of the transmission oil, such that heat is dissipated from the transmission oil to the indicated vehicle cooling circuit 16, the heat exchanger 8 is used to condensate the working medium of the expander 4, especially water or a water mixture (see the indicated lines 17, 18 of the expander 4 which guide the working medium). Detail a shows these lines 17, 18 again in a schematic way, and further lines 19 to 21 which guide the working medium of the expander 4. As can be seen, the working medium flows from the line 18 through a feedwater pump 22, line 19 into a heat exchanger 23, line 20 into a steam generator 24, line 21 into the expander 4, line 17 and back to the heat exchanger 8 in order to form the steam circuit as a working medium circuit of the expander 4. The working medium is condensed in heat exchanger 8, preheated in the heat exchanger 23, brought to the vapor state in steam generator 24 and optionally overheated and then expanded again in the expander 4. A storage reservoir will usually additionally be provided in the flow direction before the feed water pump 22, although this is not shown.

The heat exchanger 23 can also be saved according to one embodiment, or the heat exchanger 8 of transmission 3 can be included in the working medium circuit of the expander 4 instead of the heat exchanger 23. In this way, heat from the transmission 3 or from the transmission oil could be guided into the working medium circuit of the expander 4 in order to pre-heat the working medium.

The invention claimed is:

1. A drive train comprising
   an engine for supplying drive power to the drive train in order to drive driving wheels or a work machine via a drive connection;
   a transmission is provided for speed and/or torque conversion in the drive connection between the engine and the driving wheels or the work machine and comprises a primary side with a transmission input and a secondary side with a transmission output, with the engine supplying driving power to the transmission input and the driving wheels or the work machine is driven via the transmission output;
   an expander which is driven with a fluid or steam as a working medium and by means of which drive power can be supplied additionally to the drive train for driving the driving wheels or the work machine, and/or which drives an additional unit;
   wherein the expander is integrated in the transmission on its secondary side;
   wherein the transmission comprises a heat exchanger by means of which a transmission oil is cooled for lubricating the transmission and/or for actuating clutches or brakes within the transmission, with the working medium of the expander being guided in such a way through said heat exchanger that heat is dissipated from the working medium in the same in order to condense the working medium partly or in full, or to transfer heat in the heat exchanger to the working medium of the expander in order to heat the same.

2. A drive train according to claim 1, characterized in that the drive shaft of the expander is subjected to speed-increasing ratio in relation to the transmission output which is formed by a transmission output shaft, using a spur gear drive.

3. A drive train according to claim 1, characterized in that a shiftable multi-step transmission or a continuously variable transmission can be provided in the drive connection between the drive shaft of the expander and the transmission output in order to vary the gear ratio between the drive shaft and the transmission.

4. A drive train according to claim 1, characterized in that a centering device, in the shape of a centering disk, is provided on the output shaft of the expander and/or on the housing of the expander in order to center the expander and its drive shaft during mounting on the transmission housing.

5. A drive train according to claim 1, characterized in that the expander and the transmission have a common lubrication oil supply which comprises one or only one single lubrication oil sump within the transmission housing.

6. A drive train according to claim 1, characterized in that the drive shaft of the expander carries a further rotatably driven unit, a pump, water pump, fuel pump or oil pump, or carries a hydrodynamic retarder.

7. A drive train according to claim 1, characterized in that the drive shaft is insertable with its coupling element into the transmission, a bearing provided there, when the transmission is partly or fully mounted and when the expander is partly or fully mounted.

8. A drive train according to one of the claim 2, characterized in that a centering device, in the shape of a centering disk, is provided on the output shaft of the expander and/or on the housing of the expander in order to center the expander and its drive shaft during mounting on the transmission housing.

9. A drive train according to one of the claim 3, characterized in that a centering device, in the shape of a centering disk, is provided on the output shaft of the expander and/or on the housing of the expander in order to center the expander and its drive shaft during mounting on the transmission housing.

10. A drive train according to one of the claim 2, characterized in that the expander and the transmission have a common lubrication oil supply which comprises one or only one single lubrication oil sump within the transmission housing.

11. A drive train according to one of the claim 3, characterized in that the expander and the transmission have a common lubrication oil supply which comprises one or only one single lubrication oil sump within the transmission housing.

12. A drive train according to one of the claim 4, characterized in that the expander and the transmission have a common lubrication oil supply which comprises one or only one single lubrication oil sump within the transmission housing.

13. A drive train according to one of the claim 2, characterized in that the drive shaft of the expander carries a further rotatably driven unit, a pump, water pump, fuel pump or oil pump, or carries a hydrodynamic retarder.

14. A drive train according to one of the claim 3, characterized in that the drive shaft of the expander carries a further rotatably driven unit, a pump, water pump, fuel pump or oil pump, or carries a hydrodynamic retarder.

15. A drive train according to one of the claim 4, characterized in that the drive shaft of the expander carries a further rotatably driven unit, a pump, water pump, fuel pump or oil pump, or carries a hydrodynamic retarder.

16. A drive train according to one of the claim 4, characterized in that the drive shaft of the expander carries a further rotatably driven unit, a pump, water pump, fuel pump or oil pump, or carries a hydrodynamic retarder.

17. A drive train according to one of the claim 2, characterized in that the drive shaft is insertable with its coupling element into the transmission, a bearing provided there, when the transmission is partly or fully mounted and when the expander is partly or fully mounted.

18. A drive train according to one of the claim 3, characterized in that the drive shaft is insertable with its coupling element into the transmission, a bearing provided there, when the transmission is partly or fully mounted and when the expander is partly or fully mounted.

19. A drive train according to one of the claim 4, characterized in that the drive shaft is insertable with its coupling element into the transmission, a bearing provided there, when the transmission is partly or fully mounted and when the expander is partly or fully mounted.

20. A drive train according to one of the claim 5, characterized in that the drive shaft is insertable with its coupling element into the transmission, a bearing provided there, when the transmission is partly or fully mounted and when the expander is partly or fully mounted.

* * * * *